United States Patent
Ewe (10) Patent No.: US 9,927,794 B2
(45) Date of Patent: Mar. 27, 2018

(54) FEED FORWARD TERMS BASED ON CONTINUOUS MODEL

(71) Applicant: Hewlett-Packard Development Company, L.P., Houston, TX (US)

(72) Inventor: Michael Ewe, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/546,943

(22) PCT Filed: Apr. 2, 2015

(86) PCT No.: PCT/US2015/024153
§ 371 (c)(1),
(2) Date: Jul. 27, 2017

(87) PCT Pub. No.: WO2016/160026
PCT Pub. Date: Oct. 6, 2016

(65) Prior Publication Data
US 2018/0024524 A1    Jan. 25, 2018

(51) Int. Cl.
| | |
|---|---|
| *B41J 25/00* | (2006.01) |
| *G05B 19/23* | (2006.01) |
| *B41J 29/38* | (2006.01) |
| *B33Y 50/02* | (2015.01) |

(52) U.S. Cl.
CPC ............ *G05B 19/23* (2013.01); *B33Y 50/02* (2014.12); *B41J 25/001* (2013.01); *B41J 29/38* (2013.01); *G05B 2219/41437* (2013.01); *G05B 2219/45187* (2013.01)

(58) Field of Classification Search
CPC .... B41J 2/16508; B41J 19/202; B41J 23/025; B41J 2002/16576; B41J 25/001; B41J 29/38; G05B 19/23; G05B 2219/41437; G05B 2219/45189; B33Y 50/02
See application file for complete search history.

(56) References Cited

U.S. PATENT DOCUMENTS

| | | | | |
|---|---|---|---|---|
| 7,195,239 B2* | 3/2007 | Saito | .................... | B41J 11/0095 271/256 |
| 9,221,262 B2* | 12/2015 | Davis | .................. | B41J 2/16508 |

* cited by examiner

*Primary Examiner* — Thinh H Nguyen
(74) *Attorney, Agent, or Firm* — HP Inc. Patent Department (57) ABSTRACT

An example method for controlling a carriage of a printing device is described. In one implementation, a target velocity value that satisfies a sharpness threshold is filtered by a processor resource of the printing device, a feed forward term is generated using a continuous model applied to the filtered velocity input using a plurality of electromechanical parameters, a feedback term is generated based on a difference between an expected pulse-width modulation (PWM) profile and an actual PWM profile, and a voltage to be provided to a motor of the carriage is adjusted based on the feed forward term and the feedback term.

15 Claims, 5 Drawing Sheets

FEED FORWARD TERMS BASED ON CONTINUOUS MODEL

BACKGROUND

Some printing devices include a carriage that moves a marking device to place marking material on a medium (e.g., to produce an image). The carriage may be moved by a motor connected to the carriage. As components of the printing device interact, noise may be generated.

DETAILED DESCRIPTION

In the following description and figures, some example implementations of apparatus, systems, and/or methods for controlling a carriage of a printing device are described. In examples described herein, a "printing device" may be a device to print content on a physical medium (e.g., paper or a layer of powder-based build material, etc.) with a printing fluid (e.g., ink) or toner. In the case of printing on a layer of powder-based build material, the printing device may utilize the deposition of printing fluids in a layer-wise additive manufacturing process. A printing device may utilize suitable printing consumables, such as ink, toner, fluids or powders, or other raw materials for printing. In some examples, a printing device may be a three dimensional (3D) printing device. A carriage of an apparatus, such as a printing device, may be moveable to place a conveyable device on the carriage over desired locations to form an image. For example, the conveyable device can be a marking device, such as a printer pen, to mark locations on a print medium. The carriage may also be used to interact or initiate interactions with other devices of the apparatus. As the carriage moves and/or otherwise performs interactions, print quality may be affected and collisions and/or noises can be created.

Various examples described below relate to controlling a carriage with the precision of a continuous model and may, for example, contribute to a relatively smooth carriage movement profile to avoid collisions, reduce noise, improve print quality, or a combination thereof. As used herein, a "continuous model" is a mathematical description of a system that may apply to continuous data. For example, the continuous model of the system for controlling a carriage may be a mathematical formula describing effects of operational parameters on the carriage. A continuous model is distinct from a discrete model. A "profile," as used herein, refers to a collection of values that map to a carriage over time. For example, a velocity profile of a carriage may include a set of values representing the velocity of the carriage at several points during a movement of the carriage from a first location to a second location. In some examples, using a continuous model may provide a smoother round off to state transitions (where the roundness is affected by filter parameters) than a discrete model with static parameters, for example, such as a discrete model represented as a lookup table. By filtering the target velocity of the carriage to round off state transitions in conjunction with a continuous model that considers attributes of the apparatus that affect carriage movement, examples described herein may enable a relatively smooth movement profile for the carriage.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus.

Figure 1:
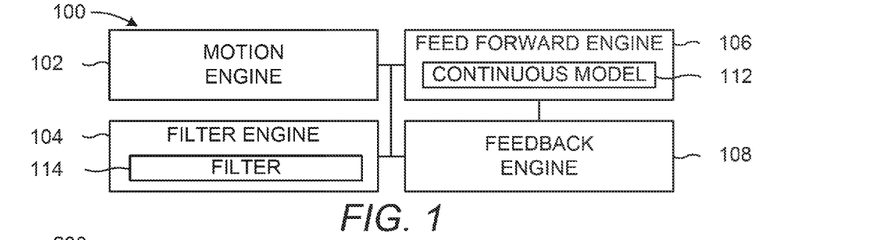
FIGS. 1-3 are block diagrams depicting example systems for controlling a carriage of a printing device.
Figure 2:
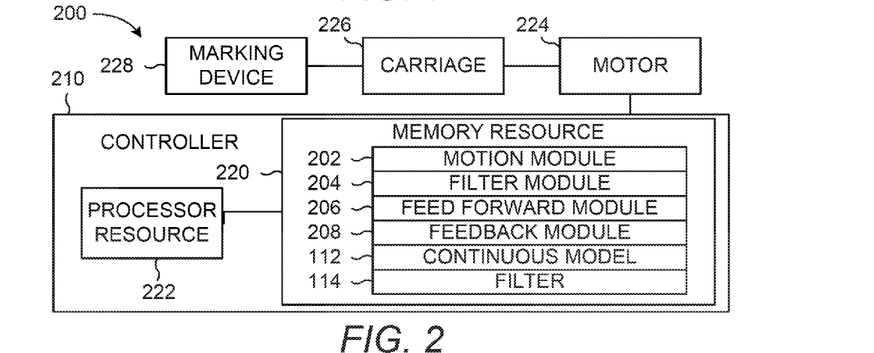
Figure 3:
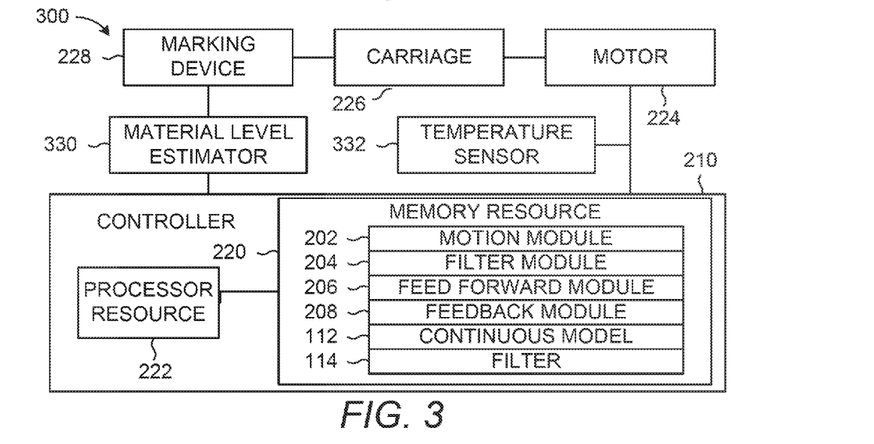

FIGS. 1-3 are block diagrams depicting example systems 100, 200, and 300 for controlling a carriage. For example, the systems 100, 200, and 300 can be implemented in a printing device to control position of a printing device pen coupled to a printing device carriage. Referring to FIG. 1, the example system 100 generally includes a filter engine 104, a feed forward engine 106, a feedback engine 108, and a motion engine 102. In general, the motion engine 102 can cause a carriage to move based on the outputs from the filter engine 104, the feed forward engine 106, and the feedback engine 108.

The filter engine 104 represents any circuitry or combination of circuitry (e.g., processor(s)) and executable instructions to filter values related to carriage movement. For example, the filter engine 104 may represent circuitry or a combination of circuitry and executable instructions to apply a filter 114 to a target velocity value associated with a carriage by changing the target velocity value from a first velocity to a second velocity when a difference between the first velocity and the second velocity achieves a sharpness threshold. A "sharpness threshold," as used herein, is a particular degree of change that exceeds a determined transition rate, such as the difference between a current value and a target value that is equal to or greater than a number that represents a determined sharpness to avoid. The filter 114 can comprise a filter parameter to round a state transition by modifying the target velocity value according to the filter parameter (e.g., change the target velocity value from a first velocity value to a second velocity value) when a sharpness threshold is achieved by the target velocity value. For example, the target velocity value can differ sufficiently from the current velocity of the carriage that a sharpness threshold is achieved. A "state transition," as used herein, refers to a change in the state of the carriage, such as a change in position of the carriage or a change in velocity of the carriage. Example states include idle, acceleration, slew, and deceleration.

As used herein, to "filter" includes applying parameter(s) to a value to modify the value if a condition applies. For example, a target velocity value is filtered when the target velocity value is changed to a target velocity when the rate of change of the input value achieves a threshold identified by a parameter of the filter 114, such as modification to a degree of acceleration or deceleration between previous velocity values and future velocity values). The filter engine 104 may apply a filter 114 on a target velocity value to generate a target velocity to, for example, operate within environmental constraints; satisfy quality metrics regarding print quality, acoustics (such as lift-off noise and clunking), etc.; and/or reduce detrimental effects on throughput or print speed. A target velocity profile may include round transitions that are acceptable to a desired roundness, such as a roundness to balance speed of operation and quality of operation. As used herein, a "round transition" is a transition that includes incremental changes in the transition rate from a first value to a second value that results in the profile in the area of the transition to appear as a curve rather than an angle. The roundness of a state transition (e.g., the size of the radius of the curve at the state transition or a degree of marginal change of each profile value at the area of the state transition) and/or the sharpness threshold may be defined by filter parameter(s). For example, the filter 114 of the filter engine 104 can be defined by a plurality of filter parameters including roll-off frequency and bandwidth of the digital filter. The plurality of filter parameters can emulate identification of the state transitions of the velocity profile and modification of the target velocity value accordingly by the filter engine 104. For example, the filter engine 104 can use a plurality of filter parameters (e.g., apply a filter 114) to identify a transition event associated with the target velocity value and modify the velocity profile at an area of the transition event. As used herein, a "transition event" is an operation that represents a state transition, such as a change in velocity to denote a state transition. In this manner, the filter engine 104 can dampen the expected carriage dynamics at the state transition. The filter engine 104 can adjust the target velocity value according to a class of the state transition (e.g., acceleration or deceleration) and a velocity change at the state transition (e.g., the degree of acceleration or deceleration) based on a filter parameter. A state transition includes any change in velocity (e.g., a difference in the current velocity and the target velocity) that exceeds a transition rate (e.g., a rate of acceleration or rate of deceleration) as determined by a sharpness threshold, such as a change in state that meets the sharpness threshold. Example state transitions include an acceleration transition from an idle state of a printing device carriage to an acceleration state of the printing device carriage, a slew transition from an acceleration state of a printing device carriage to a slew state of the printing device carriage, and a deceleration transition from a slew state of a printing device carriage to a deceleration state of the printing device carriage.

The feed forward engine 106 represents any circuitry or combination of circuitry (e.g., processor(s)) and executable instructions to determine (e.g., calculate) a feed forward term of a carriage based on a continuous model 112. A feed forward term is a predictive value of an attribute of the carriage. An example feed forward term is a pulse-width modulation (PWM) value, such as a control input for an augmented plant (e.g., a motor). For example, the feed forward engine 106 can receive a filtered target velocity value as input and calculate a PWM value based on the continuous model 112 to provide to a controller (which can then be used to convert into a voltage to drive the motor, as discussed herein with regards to the motion engine 108) and/or directly to an augmented plant.

The continuous model 112 can use a target velocity value and a plurality of electromechanical parameters. For example, the continuous model 112 can use parameters identifiable at the time of calibration of a marking device attached to a carriage, such as a mass of a device conveyable by the carriage and a friction force expected against the carriage. Other example parameters used by an example continuous model 112 include a plurality of motor parameters of the motor coupled to the carriage, such as a winding resistance of the motor and a torque constant of the motor. The continuous model 112 for the feed forward term can be developed as a function to calculate predicted values based on known or predictable changes to the operational environment of the system 100. For example, the model can be developed based on experience, operational tests, and known environment controls that profiles changes in the parameters, such as the mass parameter, the friction force parameter, and the plurality of motor parameters. Parameters such as mass, friction, and the internal motor temperature (which affects the motor parameters) can change over time and a continuous model 112 that adapts to changes in these parameters may allow for tailored movement of carriage and improved print quality.

The feed forward engine 106 can include and/or integrate with circuitry or a combination of circuitry and executable instructions to obtain the parameters used by the continuous model. For example, as shown in FIG. 3, the system can include sensors to identify system attributes to use as input parameters to the continuous model. The feed forward engine 106 can obtain the mass of a device conveyable by the carriage and estimate the friction force expected by the carriage. For example, the conveyable device can be a marking device that is periodically calibrated and via the calibration of the device on the carriage, the mass parameter and the friction force parameter can be obtained.

An example of a sensor device in an apparatus for controlling a carriage of a printing device can include a material level estimator, such as a material level estimator 330 of FIG. 3. For example, the apparatus may be a printing device comprising a marking material level estimator coupled to the marking device of the printing device and the marking material level estimator can count the number of drops fired by the marking device during operation. In that example, the mass of the marking device (e.g., the pen of the printing device) can be determined using a print fluid level estimation based on the number of fired drops since the last calibration and subtract the aggregate amount (e.g., estimated mass of the fired drops) from the mass of the marking device to obtain an updated mass being conveyed by the printing device carriage. An example of marking material is print fluid.

Another example of a sensor is a temperature sensor, such as temperature sensor 332 of FIG. 3. An example of a temperature sensor is a pen-ambient temperature sensor. In conjunction with temperature sensor, the feed forward engine 106 may estimate an internal temperature of the motor using environment data from the temperature sensor, a velocity value, and an actual motor PWM value. The internal temperature can be calculated based on the environmental data as input to a real-time thermal model. The estimated internal temperature can be used to modify the plurality of motor parameters, which, in turn, changes the continuous model 112 used to determine the feed forward term.

The feedback engine 108 represents any circuitry or combination of circuitry (e.g., processor(s)) and executable instructions to determine (e.g., calculate) a feedback term. A feedback term is a comparative value between an expected value and an actual value of the system 100. For example, the feedback term can be a PWM value calculated based on the difference between the target PWM value of a target PWM profile and the actual PWM value used to actuate the carriage. For another example, the feedback term can be a value (such as a velocity value or a PWM value) based on a difference between the target velocity value and an actual velocity value of the carriage. The feedback engine 108 can calculate the feedback term to compensate the PWM value (or velocity value) for unmodelled dynamic, estimation errors, and non-linearities of an actual PWM profile (or actual velocity profile) of the carriage in comparison to the expected PWM profile (or expected velocity profile). In this manner, the feedback engine 108 modifies input values based on the difference in velocity between the target expected velocity and actual measured velocity. Using both the feed forward term and the feedback term, the carriage can be moved both proactively and reactively to compensate for changes in the operation environment, such as changes in mass, wear, temperature, etc., whether modelled or unmodelled.

The motion engine 102 represents any circuitry or combination of circuitry (e.g., processor(s)) and executable instructions to cause a carriage to move based on the feed forward term and the feedback term. For example, the motion engine 102 can represent a combination of circuitry and executable instructions to cause a voltage associated with the feed forward term and the feedback term to apply to a motor of the carriage. The motion engine 102 can comprise a controller used to derive voltage from values used by the system 100, such as convert a PWM value to a voltage. For example, the motion engine 102 can include a proportional controller with mathematical functionality, such as a proportional integral controller, a proportional derivative controller, or a proportional integral derivative controller. The motion engine 102 can control the motor using a pulse-width modulation (PWM) functionality that calculates a motor voltage based on the feed forward term and the feedback term. The motion engine 102 can comprise a print-side driver or other executable instructions, with circuitry, to control the motion of the carriage via the motor coupled to the carriage. As used herein, the "print-side driver" comprises executable instructions or a print processor to operate mechanism(s) of the printing device, such as a servo of the printing device. For example, the motion engine 102 can cause the motor to compensate or derate the movement of the carriage based on the feed forward and feedback terms as they are affected by compensatory or derating changes in the mass, friction, motor characteristics, etc. In some examples, functionalities described herein in relation to any of FIGS. 1-3 may be provided in combination with functionalities described herein in relation to any of FIGS. 4-8.

FIGS. 2 and 3 depict the example systems 200 and 300 for controlling a carriage. Referring to FIG. 2, the system 200 can comprise a controller 210, a carriage 226, a motor 224 operatively coupled to the carriage 226, and a marking device 228 coupled to the carriage 226. The controller 210 can comprise a memory resource 220 operatively coupled to a processor resource 222. FIG. 3 depicts the system 300 can include the components of the system 200 with a material level estimator 330 and a temperature sensor 332.

Referring to FIGS. 2 and 3, the memory resource 220 comprises instructions that are executable by the processor resource 222. The set of instructions are operable to cause the processor resource 222 to perform operations of the system 200 when the set of instructions are executed by the processor resource 222. The set of instructions stored on the memory resource 220 can be represented as a motion module 202, a filter module 204, a feed forward module 206, and a feedback module 208. The motion module 202, the filter module 204, the feed forward module 206, and the feedback module 208 represent program instructions that when executed function as the motion engine 102, the filter engine 104, the feed forward engine 106, and the feedback engine 108 of FIG. 1, respectively. The processor resource 222 can carry out a set of instructions to execute the modules 202, 204, 206, 208, and/or any other appropriate operations among and/or associated with the modules of the system 200. For example, the processor resource 222 may carry out a set of instructions to digitally filter a target velocity value based on a filter parameter, calculate a PWM value associated with an expected velocity of a continuous model 112 (e.g., a predictive PWM model based on a mass of the marking device, a friction force expected by the carriage, and a motor parameter) using a filtered target velocity value, and cause the motor to move the carriage on a rod based on a motor voltage value derived from the PWM value. Any executable instructions described herein may be stored on at least one machine-readable storage medium.

Although these particular modules and various other modules are illustrated and discussed in relation to FIG. 2 and other example implementations, other combinations or sub-combinations of modules can be included within other implementations. For example, although the modules illustrated in FIG. 2 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

As used herein, a "processor resource," such as processor resource 222, is any appropriate circuitry capable of processing (e.g., computing) instructions, such as one or multiple processing elements capable of retrieving instructions from the memory resource 220 and executing those instructions. For example, the processor resource 222 can be a central processing unit (CPU) that enables controlling a carriage by fetching, decoding, and executing modules 202, 204, 206, and 208. Example processor resources (e.g., processor(s)) include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). The processor resource 222 can include multiple processing elements that are integrated in a single device or distributed across devices. The processor resource 222 can process the instructions serially, concurrently, or in partial concurrence.

As used herein, a "memory resource," such as memory resource 220, represents a medium to store data utilized and/or produced by the system 200. Data used by the system 200 include the continuous model 112 and the filter 114, for example. The medium is any non-transitory medium or combination of non-transitory media able to electronically store data, such as modules of the system 200 and/or data used by the system 200. For example, the medium can be a storage medium, which is distinct from a transitory transmission medium, such as a signal. The medium can be machine-readable, such as computer-readable. The medium can be an electronic, magnetic, optical, or other physical storage device that is capable of containing (i.e., storing) executable instructions. The memory resource 220 can be said to store program instructions that when executed by the processor resource 222 cause the processor resource 222 to implement functionality of the system 200 of FIG. 2 (or system 300 in the case of FIG. 3). The memory resource 220 can be integrated in the same device as the processor resource 222 or it can be separate but accessible to that device and the processor resource 222. The memory resource 220 can be distributed across devices. The memory resource 220 can represent the same physical medium or separate physical media.

In the discussion herein, the engines 102, 104, 106, and 108 of FIG. 1 and the modules 202, 204, 206, and 208 of FIGS. 2 and 3 have been described as circuitry or a combination of circuitry and executable instructions. Such components can be implemented in a number of fashions. Looking at FIG. 2, the executable instructions can be processor-executable instructions, such as program instructions, stored on the memory resource 220, which is a tangible, non-transitory computer-readable storage medium, and the circuitry can be electronic circuitry, such as processor resource 222, for executing those instructions. The instructions residing on the memory resource 220 can comprise any set of instructions to be executed directly (such as machine code) or indirectly (such as a script) by the processor resource 222.

Figure 6:
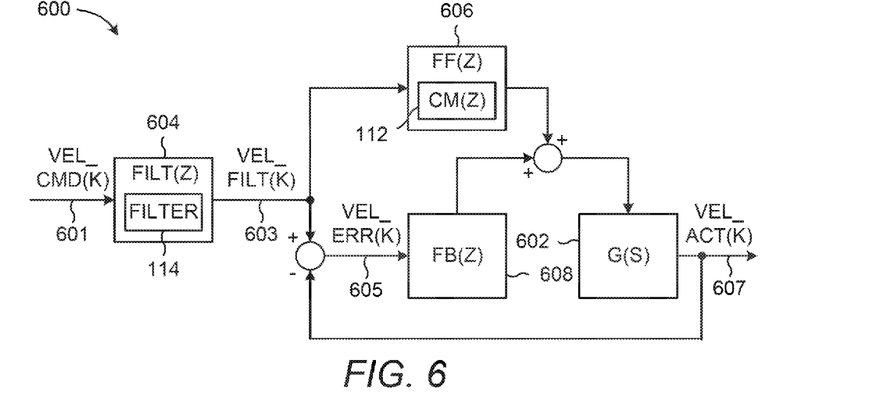
FIGS. 6-8 are flow diagrams depicting example methods for controlling a carriage of a printing device.
Figure 7:
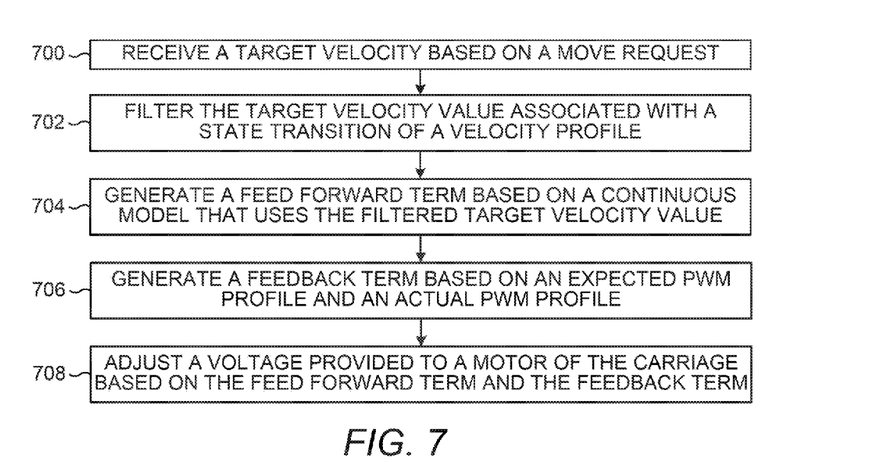
Figure 8:
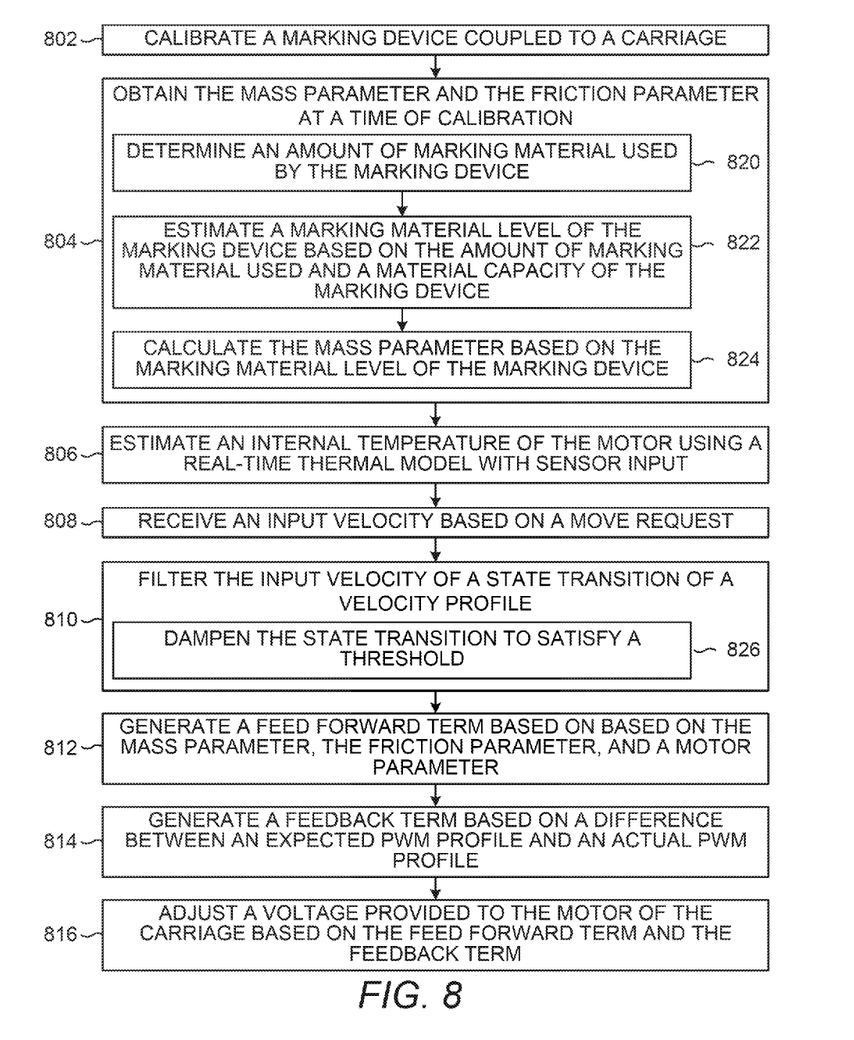

In some examples, the system 200 can include the executable instructions can be part of an installation package that when installed can be executed by the processor resource 222 to perform operations of the system 200, such as methods described with regards to FIGS. 6-8. In that example, the memory resource 220 can be a portable medium such as a compact disc, a digital video disc, a flash drive, or memory maintained by a computer device, such as a cloud service device, from which the installation package can be downloaded and installed. In another example, the executable instructions can be part of an application or applications already installed. The memory resource 220 can be a non-volatile memory resource such as read only memory (ROM), a volatile memory resource such as random access memory (RAM), a storage device, or a combination thereof. Example forms of a memory resource 220 include static RAM (SRAM), dynamic RAM (DRAM), electrically erasable programmable ROM (EEPROM), flash memory, or the like. The memory resource 220 can include integrated memory such as a hard drive (HD), a solid state drive (SSD), or an optical drive.

A connection between blocks (a link) in FIGS. 1-3 generally represents one or a combination of a cable, wireless connection, fiber optic connection, or remote connections via a telecommunications link, an infrared link, a radio frequency link, or any other connectors of systems that provide electronic communication. The link can include, at least in part, intranet, the Internet, or a combination of both. The link can also include intermediate proxies, routers, switches, load balancers, and the like.

Referring to FIGS. 1-3, the engines 102, 104, 106, and 108 of FIG. 1 and/or the modules 202, 204, 206, and 208 of FIG. 2 can be distributed across compute devices or integrated in a single device, such as a printing device. The engine and/or modules can complete or assist completion of operations performed in describing another engine and/or module. For example, the motion engine 102 of FIG. 1 can request, complete, or perform the methods or operations described with regards to the motion engine 102 as well as the filter engine 104, the feed forward engine 106, and the feedback engine 108 of FIG. 1. Thus, although the various engines and modules are shown as separate engines in FIGS. 1-3, in other implementations, the functionality of multiple engines and/or modules may be implemented as a single engine and/or module or divided in a variety of engines and/or modules. In some examples, the engines of the system 100 can perform example methods described in connection with FIGS. 6-8.

Figure 4:
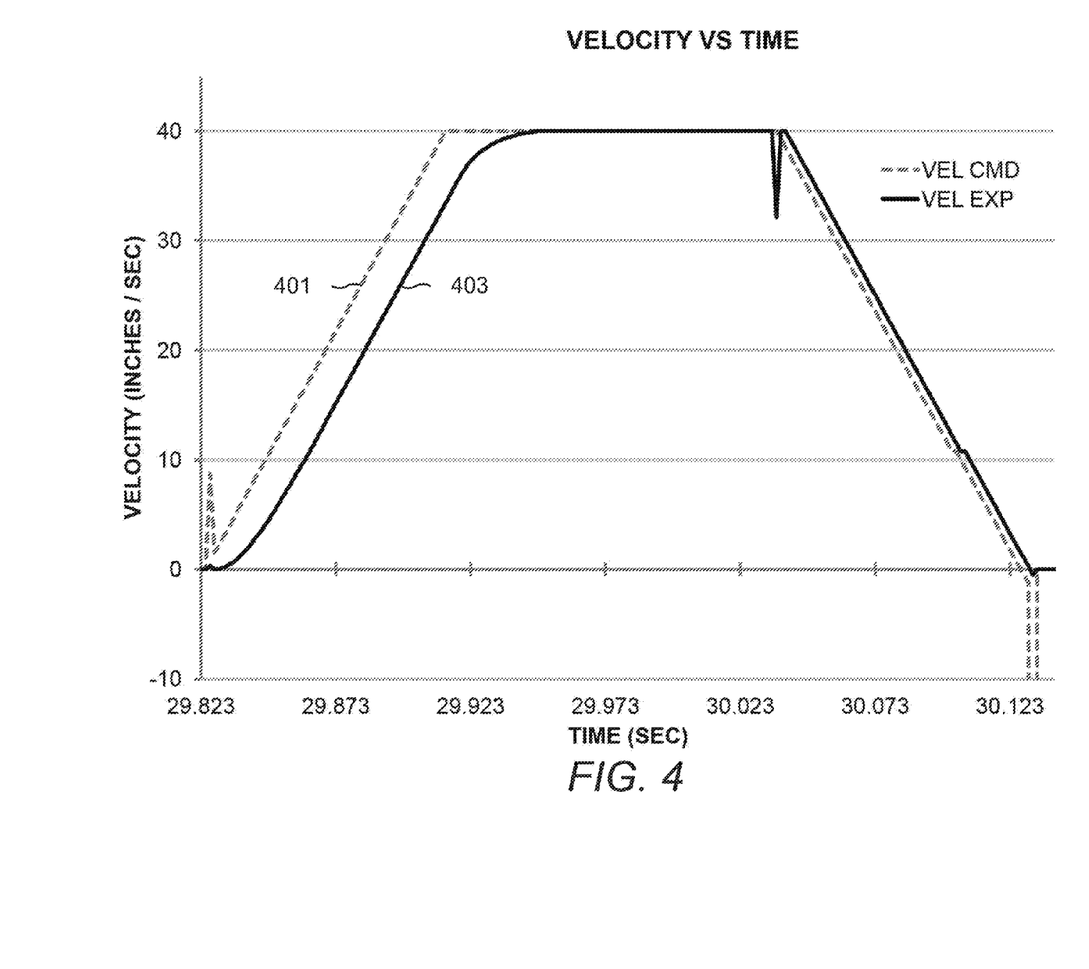
FIGS. 4 and 5 are example charts depicting example profiles of carriage-related values.
Figure 5:
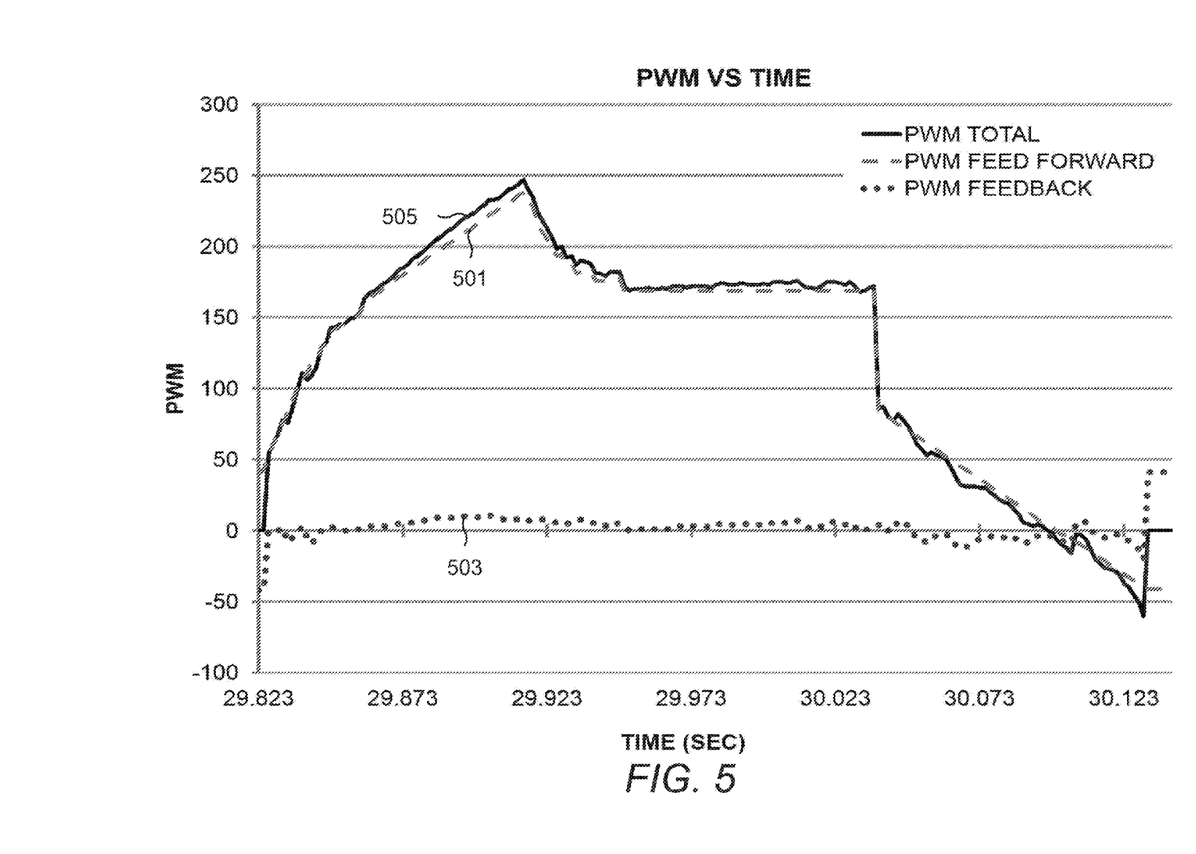

FIGS. 4 and 5 are example charts depicting example profiles of carriage-related values. FIG. 4 is a chart depicting the profile 401 of a velocity profile of unfiltered inputs as compared to the profile 403 of filtered inputs during a 40 inches per second (IPS) move of a printing device carriage. The filtering of values of profile 401 to create the values of profile 403 may be performed by, for example, a filter engine 104 of FIG. 1 using a filter 114. The roundness of the profile 403 (as shown in the up ramp and down ramp, for example) is determined based on the parameters of the filter applied to the values of the velocity profile 401. The roundness represents a tradeoff between performance (e.g., how fast the carriage can be accelerated or decelerated to complete the move) and print quality (e.g., how straight the marking device can draw lines and minimize print quality artifacts). For example, the sharpness of the transition in slope of the profile 401 may produce collisions and noise and having a smoother (e.g., rounder) transition may avoid such undesirables. The roundness can be adjusted by changing the filter parameters (e.g., roll-off frequency or bandwidth of the digital filter). For example, the filter can include parameters identified from testing a printing device apparatus to determine an acceleration range designed into the carriage bearings, such as identification of an acceleration speed that produces lift-off.

Referring to FIG. 5, the chart depicts a feed forward PWM profile 501, a feedback PWM profile 503, and an actual PWM profile 505 used to actuate the motor. In this example of a 40 IPS move, the actual PWM profile 505 is created by combining the values of the feed forward profile 501 and the values of the feedback profile 503. In an example system 100 of FIG. 1, the feed forward engine 106 can determine the values of feed forward PWM profile 501, the feedback engine 106 can determine the values of the feedback PWM profile 503, and the motion engine 102 can determine the values of the actual PWM profile 505.

The profiles discussed herein may be designed into a controller. For example, the controller 210 of FIGS. 2 and 3 may use a filter 114 and a continuous model 112 to emulate the profiles shown in FIGS. 4 and 5. In this manner, a system or apparatus for controlling a carriage can use the feed forward continuous model 112 to compensate for, and overcome within a reactive tolerance, the combined forces arising from interactions of the carriage.

FIG. 6 is a flow diagram depicting example operations of an example system 600 for controlling a carriage of a printing device. Referring to FIG. 6, the example components of FIG. 6 generally include data 601, 603, 605, and 607 and functions 602, 604, 606, and 608 as implemented via a combination of circuitry and executable instructions, such as firmware executing on an ASIC in a printing device. FIG. 6 depicts an example operation flow for controlling a carriage in response to a carriage move request. As used herein, a "carriage move request" represents an instruction to move the carriage to a desired position).

The data 601, represented as vel_cmd(k), represents an input velocity value received as a parameter to the filter function 604, represented as filt(z). The filter function 604 applies a filter 114 to the vel_cmd(k) value to produce a filtered input velocity value 603, represented as vel_filt(k). The filter function 604 can be performed, for example, by the filter engine 104 of FIG. 1 or by the processor resource 222 of FIGS. 2 and 3 when executing the filter module 204.

The filtered input velocity value 603 is transferred to both the feed forward function 606, represented as ff(z), and the feedback function 608, represented as fb(z), as a difference value 605, represented as vel_err(k). The feed forward function 606 can be performed, for example, by the feed forward engine 106 of FIG. 1 using the continuous model 112 or by the processor resource 222 of FIGS. 2 and 3 when executing the feed forward module 206. The feedback function 608 can be performed, for example, by the feedback engine 108 of FIG. 1 or by the processor resource 222 of FIGS. 2 and 3 when executing the feedback module 208. As shown in FIG. 6, the difference value 605 is calculated by combining filtered target velocity value 603 and the negative of the actual velocity value 607, represented as vel_act(k). In this example, data 601, 603, 605, and 607 represent velocity values whereas the outputs of the feed forward function 606 and the feedback function 608 are PWM values and combine to an input PWM value for use with augmented plant function 602, represented as g(s). The actual velocity value 607 of the carriage is recaptured as input to determine the difference value 605.

The conversion of the digital calculations to a mechanical voltage output is represented via the augmented plant function 602, which can convert the PWM value to an electrical signal useable by the motor to move the carriage. The augmented plant function 602 can be performed by, for example, an augmented plant, which represents a motion engine 102 of FIG. 1, a print-side driver, a motor interface, or other digital-to-mechanical conversion mechanism, such as a combination thereof. For another example, the augmented plant function 602 can be performed by the processor resource 222 of FIGS. 2 and 3 when executing the motion module 202.

The functions 602, 604, 606, and 608 can performed by an apparatus or system for controlling a carriage of a print device. For example, the engines 102, 104, 106, and 108 of FIG. 1 or the processor resource 222 and memory resource 220 comprising modules 202, 204, 206, and 208 of FIGS. 2 and 3 described above can perform the functions 602, 604, 606, and 608, to produce an actual velocity 607 of the carriage.

FIGS. 7 and 8 are flow diagrams depicting example methods for controlling a carriage of a printing device. The systems 100, 200, and 300 described above with reference to FIGS. 1-3 may perform the methods described with respect to FIGS. 7 and 8. Referring to FIG. 7, example methods for controlling a carriage generally comprise receiving a target velocity value based on a carriage move request, filtering a target velocity value identified within a state transition of a velocity profile, generating a feed forward term based on a continuous model, generating a feedback term, and adjusting a voltage provided to a motor of the carriage based on the feed forward term and the feedback term.

At block 700, a target velocity value is received via a driver interface of the printing device based on a carriage move request. As used herein, the "driver interface of the printing device" is the print side of the interface established by the driver (e.g., the receiving side at the printing device of a print job communicated from the computer device to a printing device). A carriage move request can provide a position and identify the target velocity to reach the position based on a print mode (e.g., high quality print mode may have a slower IPS velocity than draft quality print mode). For example, a position can be requested, such as a cap position, and a velocity at a particular IPS can be identified by the printing device (e.g., a combination of a processor resource and the print side driver). As used herein, the print-side driver represents executable instructions that when executed cause the printing device to perform a carriage move request. The print-side driver can manage the operations of the carriage by making requests to a system, such as systems 100-300 of FIGS. 1-3, with the target velocity.

At block 702, a target velocity value associated with a state transition of a velocity profile is filtered. The filter, such as filter 114 of FIG. 1, applied to the target velocity value can identify a velocity transition that achieves a sharpness threshold (e.g., exceeds a change in velocity maximum). As the velocity of the carriage changes, the degree of change can be dampened (e.g., reduce the slope of the change) to occur gradually over time rather than making an instantaneous change from one velocity to another when the change between the first velocity to the second velocity exceeds the sharpness threshold.

At block 704, a feed forward term is generated based on a continuous model. The continuous model takes the filtered target velocity value and calculates a value based on a plurality of electromechanical parameters. For example, the continuous model may provide outputs that can vary in relation to changes in the mass parameter, the friction parameter, the motor parameter, the filtered target velocity value, the position of the carriage, and other system or environmental changes. The input parameters to the continuous model (such as the mass parameter, the friction parameter, and the motor parameter) can be achieved via system sensors and/or calculations (such as models). In an example method, the output of the continuous model may be a PWM value useable to provide to an augmented plant (e.g., print-side driver, motor, etc.) to convert to a mechanism to move the carriage.

At block 706, a feedback term is generated based on an expected PWM profile of the carriage and an actual PWM profile of the carriage. The difference in the expected and actual PWM values may be due to unmodelled dynamics and external disturbance causes. The feedback term can be used to modify the result of the continuous model to compensate for those unmodelled or external differences in actual and expected values. In this manner, a system, such as system 100 for controlling a carriage, can adapt to operation that may not fit the parameters as modelled and may be able to individually tailor carriage movement of the apparatus using the feedback term.

At block 708, a voltage provided to a motor of the carriage is adjusted based on the feed forward term and the feedback term. For example, the feed forward term and the feedback term can be combined into an overall PWM value used to power the carriage motor.

FIG. 8 includes blocks similar to the blocks of FIG. 7 and provides additional blocks and details. In particular, FIG. 8 depicts additional example blocks and example details generally regarding calibrating a marking device, obtaining parameters for the continuous model, and dampening the state transitions. Blocks 808, 810, 812, 814, and 816 are similar to blocks 700, 702, 704, 706, and 708 of FIG. 7 and, for brevity, their respective descriptions are not repeated in their entirety.

At block 802, a marking device coupled to the carriage is calibrated. Calibration may assist mitigation of effects introduced in the manufacturing process as well as use of marking device (and other components of a printing device system, for example) over time. As part of the calibration phase exampled in FIG. 8, the mass parameter and the friction parameter is obtained at block 804. In the example of FIG. 8, the mass parameter is obtained by determining an amount of marking material used by the marking device at block 820. The amount of marking material used can be determined in a variety of ways, such as counting drops expressed by the marking device. In the example at block 804, a marking material level of the marking device is estimated based on the amount of marking material used (as determined at block 822) and a material capacity of the marking device (e.g., the capacity size of the ink cartridge). At block 824, the mass parameter is calculated based on the marking material level of the marking device in the example of FIG. 8. In this manner, as the marking material is used, the mass of the marking device changes, and the continuous model is updated accordingly (and, therefore, the feed forward term is updated accordingly).

At block 806, an internal temperature of the motor may be estimated using a real-time thermal model with input from an ambient temperature sensor. The thermal model may use a motor PWM, a velocity, and an ambient temperature value from the ambient temperature sensor. As discussed herein, the internal temperature of the motor may affect the motor parameter(s) used in the continuous model and, thus, the internal temperature can indicate changes to continuous model output values to appropriately compensate for the carriage velocity.

As exampled in at block 826, the state transition of the velocity profile may be dampened to satisfy at least one of an excitation threshold and an acoustic threshold. As used herein, an "excitation threshold" is a known or modeled threshold regarding excessive movement of the carriage and an "acoustic threshold" is a known or modeled threshold regarding noise quality. The thresholds can be identified and used in setting or otherwise establishing the parameters of the filter. In this manner, a system or apparatus implementing this method, such as systems 100-300 can operate within quality standards.

Using the example methods and/or the example components of the systems and apparatus described herein, individual printing devices can maintain performance based on calibration, adaptive modeling, and changes to the operational environment over time. As a result, printing device manufacturing tolerances may, for example, be relaxed and servos may maintain performance based on individual operating environment characteristics (rather than being calibrated for variation in a group of units and variation in general operational environment characteristics).

Although the flow diagrams of FIGS. 6-8 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A system comprising:
a filter engine to apply a filter to a target velocity value associated with a carriage, the filter including a filter parameter to round a state transition by changing the target velocity value from a first velocity value to a second velocity value when a first difference between the first velocity value and the second velocity value achieves a sharpness threshold;
a feed forward engine to determine a feed forward term of a carriage based on a continuous model that uses a target velocity value of the velocity profile, a mass of a device conveyable by the carriage, and a friction force expected against the carriage;
a feedback engine to determine a feedback term based on a second difference between the target velocity value and an actual velocity value of the carriage; and
a motion engine to cause the carriage to move based on the feed forward term and the feedback term.

2. The system of claim 1, wherein:
the motion engine comprises a proportional controller that controls the motor using a pulse-width modulation (PWM) functionality that calculates a motor voltage based on the feed forward term and the feedback term, the feed forward term to be a PWM value of a target PWM profile; and
the filter engine is to:
identify the state transition of the velocity profile; and
modify the velocity profile at an area of the state transition to adjust to a class of the state transition and a velocity change at the state transition based on a filter parameter.

3. The system of claim 1, wherein the feed forward engine is further to:
obtain the mass and the friction force via calibration of the device on the carriage; and
estimate an internal temperature based on a real-time thermal model using environment data, the actual velocity value, and an actual motor PWM value,
wherein the continuous model uses a plurality of motor parameters.

4. The system of claim 3, wherein the feed forward engine is further to:
obtain the environment data using an ambient temperature sensor; and
modify the plurality of motor parameters based on the internal temperature,
wherein the plurality of motor parameters comprises a winding resistance and a torque constant.

5. The system of claim 3, wherein the feed forward engine is further to:
determine the mass of the device using a print fluid level estimator based on a number of fired drops,
wherein the carriage is a printing device carriage and the device is a printing device pen.

6. An apparatus comprising:
a carriage;
a marking device coupled to the carriage;
a motor operatively coupled to the carriage; and
a controller comprising a processor resource and a computer-readable storage medium comprising a set of instructions executable by the processor resource to:
filter a target velocity value based on a filter parameter;
calculate a feed forward term comprising a pulse-width modulation (PWM) value associated with an expected velocity of a continuous model using the filtered target velocity value based on a mass of the marking device, a friction force expected by the carriage, and a motor parameter; and
cause the motor to move the carriage based on the PWM value.

7. The apparatus of claim 6, further comprising:
a pen-ambient temperature sensor to obtain environmental data within the apparatus; and
wherein the set of instructions is executable by the processor resource to:
calculate a temperature estimate of the motor based on the environmental data.

8. The apparatus of claim 6, further comprising:
a marking material level estimator coupled to the marking device, the marking material level estimator to count a number of drops fired by the marking device.

9. The apparatus of claim 6, wherein the set of instructions to filter the digital model of the target velocity value is executable by the processor resource to:
identify a transition event associated with the target velocity value; and
dampen a change in velocity at a profile area of the transition event.

10. The apparatus of claim 6, wherein the set of instructions is executable by the processor resource to:
compensate the PWM value for unmodelled dynamic, estimation errors, and non-linearities of an actual velocity of the carriage in comparison to the expected velocity.

11. A method for controlling a carriage of a printing device comprising:
receiving a target velocity value via a driver interface of the printing device based on a carriage move request;
filtering, by a processor resource of the printing device, the target velocity value identified as within a state transition of a velocity profile that satisfies a sharpness threshold;
generating, by the processor resource, a feed forward term based on a continuous model that uses the filtered target velocity value and a plurality of electromechanical parameters identifiable at calibration;
generating, by the processor resource, a feedback term based on a difference between an expected pulse-width modulation (PWM) profile of a carriage and an actual PWM profile of the carriage; and
adjusting a voltage to be provided to a motor to move the carriage based on the feed forward term and the feedback term.

12. The method of claim 11, wherein:
filtering the target velocity value comprises:
dampening the state transition to satisfy at least one of an excitation threshold and an acoustic threshold.

13. The method of claim 11, comprising:
calibrating a marking device coupled to the carriage; and
identifying the mass parameter and the friction parameter at a time of calibration,
wherein the plurality of electromechanical parameters comprise the mass parameter, the friction parameter, and a motor parameter.

14. The method of claim 13, comprising:
determining an amount of marking material used by the marking device;
estimating a marking material level of the marking device based on the amount of marking material used and a material capacity of the marking device; and
calculating the mass parameter based on the marking material level of the marking device.

15. The method of claim 11, comprising:
estimating an internal temperature of the motor using a real-time thermal model with input from an ambient temperature sensor.

* * * * *